(12) United States Patent
McAfee et al.

(10) Patent No.: US 6,545,207 B2
(45) Date of Patent: Apr. 8, 2003

(54) ELECTRIC DRUM STROKE COUNTING MACHINE

(76) Inventors: Derrell W. McAfee, 203 McMillin St., Nashville, TN (US) 37201; Craig A. Kestner, 259 Cain Dr., Blountville, TN (US) 37617

( * ) Notice: Subject to any disclaimer, the term of this patent is extended or adjusted under 35 U.S.C. 154(b) by 0 days.

(21) Appl. No.: 10/138,721

(22) Filed: May 3, 2002

(65) Prior Publication Data

US 2002/0184993 A1 Dec. 12, 2002

Related U.S. Application Data

(63) Continuation of application No. 09/621,061, filed on Jul. 21, 2000, now abandoned
(60) Provisional application No. 60/144,740, filed on Jul. 21, 1999.

(51) Int. Cl.[7] .............................................. G09B 15/06
(52) U.S. Cl. .................................................... 84/470 R
(58) Field of Search .......................... 84/411 R, 470 R, 84/484, 411 D

(56) References Cited

U.S. PATENT DOCUMENTS

| 5,036,742 A | 8/1991 | Youakim | 84/411 |
| 5,256,832 A | 10/1993 | Miyake | 84/636 |
| 5,453,567 A | 9/1995 | Brinson | 84/104 |
| 5,521,324 A | 5/1996 | Dannenberg et al. | 84/612 |
| 5,663,514 A | 9/1997 | Usa | 84/600 |

*Primary Examiner*—Jeffrey Donels
(74) *Attorney, Agent, or Firm*—David B. Pieper; Phillip E. Walker; Waddey & Patterson

(57) ABSTRACT

A drum beat counter that can be attached to either a conventional drum head or an electronic drum kit. The counter counts the number of beats over a given time set by the user. The drum beat counter includes a strike sensor adapted to detect the strikes and create a strike signal, a strike counter electrically connected to the strike sensor and adapted to receive the strike signal, adapted to detect strikes represented in the strike signal, and further adapted to create a count signal; and a display electrically connected to the counter and adapted to receive the count signal and present a representation of the number of strikes. This device can be used in many ways including speed counting or ensuring that the drum actually beats the number of times desired.

19 Claims, 7 Drawing Sheets

| | | | |
|---|---|---|---|
| 1 | 4013 | | U7 |
| 1 | 1071 | | U12 |
| 1 | 1093 | | U6 |
| 2 | 4518 | | U10, U11 |
| 2 | 4522 | | U3, U4 |
| 1 | 4538 | | U3 |
| 6 | 4547 | | U1, U2, U6, U7, U8, U9 |
| 1 | 7805 | | U8 |
| 1 | 78L05 | | U1 |
| 1 | 79L05 | | U2 |
| 1 | C | 0.1 | C1 |
| 2 | C | 0.01 | C10, C6 |
| 1 | C | 0.01 | C5 |
| 1 | C | 2.2 | C8 |
| 5 | C+ | 1.0 | C1, C2, C3, C4, C9 |
| 1 | C+ | 1N914 | C7 |
| 2 | D | | D1, D2 |
| 6 | DISP-7-SEG | | D1, D2, D3, D4, D5, D6 |
| 1 | LF356 | | U4 |
| 1 | R | 100K | R1 |
| 4 | R | 100K | R10, R7, R8, R9 |
| 1 | R | 10K | R2 |
| 1 | R | 10K | R3 |
| 1 | R | 10K | R4 |
| 1 | R | 100K | R5 |
| 1 | SPG8651A | | U5 |
| 1 | SW-DIP-4 | | SW1 |
| 1 | SW-PB-1A | | SW2 |
| 1 | TL082 | | U5 |

Figure 9

ELECTRIC DRUM STROKE COUNTING MACHINE

This application is a continuation of Utility patent application Ser. No. 09/621,061 filed Jul. 21, 2000, now abandoned, entitled "Electronic Drum Stroke Counting Machine" which claims priority as a continuation of Provisional U.S. Patent Application Serial No. 60/144,740 filed Jul. 21, 1999, entitled "Electronic Drum Stroke Counting Machine."

BACKGROUND OF THE INVENTION

The present invention relates to a musical testing device and more particularly to a drum beat counter attachable to a drum head. The speed of drum beating and stick speed has long been debated between drummers. A reliable method and apparatus for counting drum beats is needed to measure the drum beats or stick speed for drummers. Furthermore, drumming students need to practice speed and timing of drum beats to ensure that a cadence is being performed at the proper rate over time. Thus, what is needed is a drum beat counter to measure stick speed and drum beats over a time period for improved drumming information.

SUMMARY OF THE INVENTION

The present invention utilizes a piezo sensor attached to a drum head to count the number of beats on the drumhead. The piezo senses each time a drum stroke is made and sends a signal into drum beat counter which counts number of strokes. The preferred embodiment of the system only counts the drum beats occurring during a fixed period of time. The time period can be set to count down from any set time so that user can count the number of drum strokes occurring during the period of time. The following schematics, drawings, and parts lists explain in greater detail the operation of the machine.

BRIEF DESCRIPTION OF THE DRAWINGS

FIG. 9 is a parts list for elements of the preferred embodiment of the invention.

DESCRIPTION OF THE PREFERRED EMBODIMENTS

Figure 1:
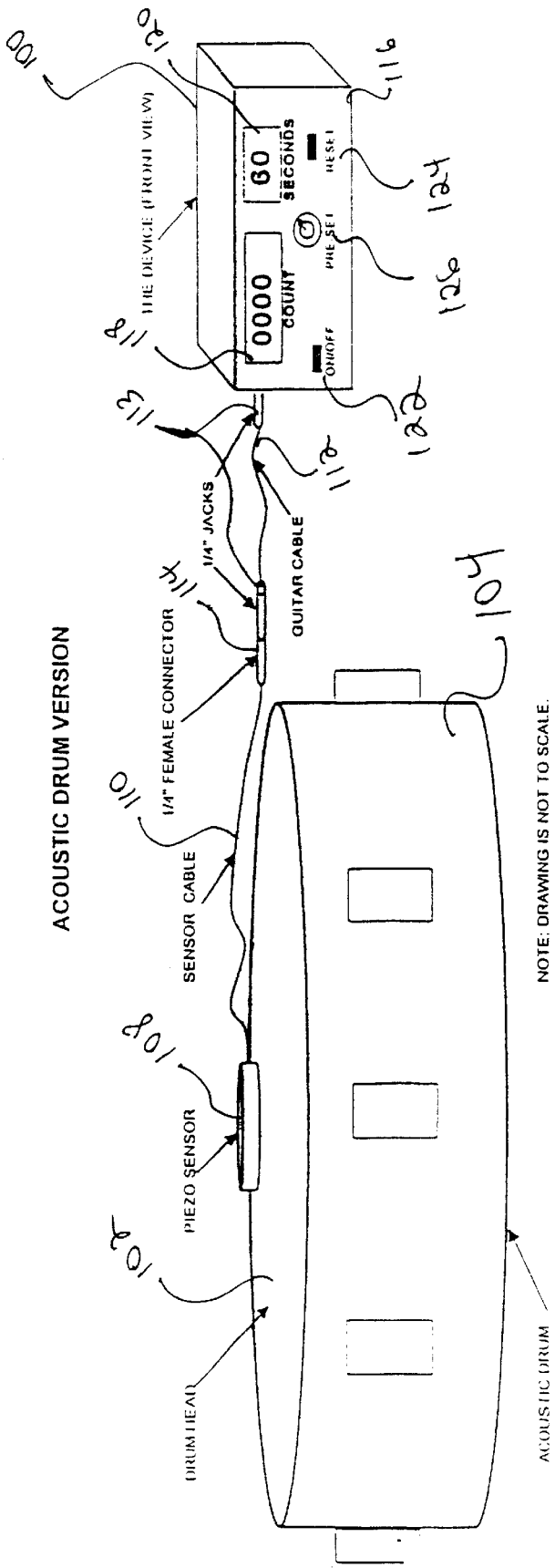
FIG. 1 is an assembly drawing of the drum beat counter attached to a conventional drum head.

The drum beat counter device or apparatus 100 is designed to measure the total number of strikes against a drum head 102 as a measurement of a drummer's hand or foot speed. The drum beat counter 100 measures the total number of strikes hit by a drummer onto a vibrating surface, such as a drum head 102, during a controlled period of time. The device 100 is capable of application on both acoustic drums 104 and electronic drums 106.

FIG. 1 of the drawings shows the drum beat counter apparatus 100 of the present invention mounted on an acoustic drum 104. As shown in FIG. 1 of the drawings, a piezo type strike sensor 108 is attached to a drum head 102 on an acoustic drum 104 or other vibrating surface to generate a strike signal in accordance with the vibrations created by the strikes on the drum head. The piezo sensor 108 is connected by a sensor cable 110 to the drum beat counter 100. An optional portable connection through a guitar cable 112, guitar jacks 113, and female connector 114 is shown to allow for the piezo sensor 108 to be permanently mounted to the drum head 102 while allowing for removal of the drum beat counter 100. The sensor cable 110 connects to the counter 100 through the drum input port 111 shown in FIG. 3.

The front 116 of the drum beat counter 100 is shown which includes a information presenters such as a count information display 118 and a time information display 120. The count display 118 is presented as a four digit digital display counter that corresponds to the number of counts detected by the drum beat counter 100. The time display 120 is a two digit digital display which is used to show the current status of the timer as a counting time in seconds. Other types of information presenters and displays, such as LED meter displays, pie chart displays, or graphic display screens may also be utilized for visual displays, or sound devices such as speakers with a tone generator may be used for presenting the counting information to the user. Thus, the preferred embodiment's screen type display is merely a way to present the number of counts to the user in an easily recognizable format.

An on/off power switch 122 is provided for turning the counter 100 on and off, and the reset 124 is shown as a button for resetting the counter 100. A time period selector 126 is shown as a preset dial selector for selecting the period of time to be used for the counting of the strikes.

The counter 100 uses an internal strike counter 152 to detect the number of beats or strikes on the drum head 102 and increments the drum beat count shown on the count display 118 by one for each strike. The preferred embodiment uses the preset dial selector 126 to set the time interval for counting between ten and ninety seconds at ten second intervals. While the present embodiment counts in ten second intervals, it is also envisioned that any other time interval, including one second intervals, could also be used without departing from the scope of this invention. The time is designed to count down from the pre-selected number, by decrementing the time period counter by one for each second on the time display 120. The time allows for the counter 100 to begin counting upon the first drum beat and stops the counter 100 upon reaching zero seconds. Thus, when the timer reaches zero, the counter 100 will stop counting and will display the total number of strikes against the drum head during the countdown. Upon pressing the momentary reset button 124 on the front of the drum beat counter 100, or applying the reset signal through the external rest port 128, the counter will be rest to zero and the timer will reset according to the setting on the preset dial 124. The above sequence may then be repeated for the next counting.

Figure 2:
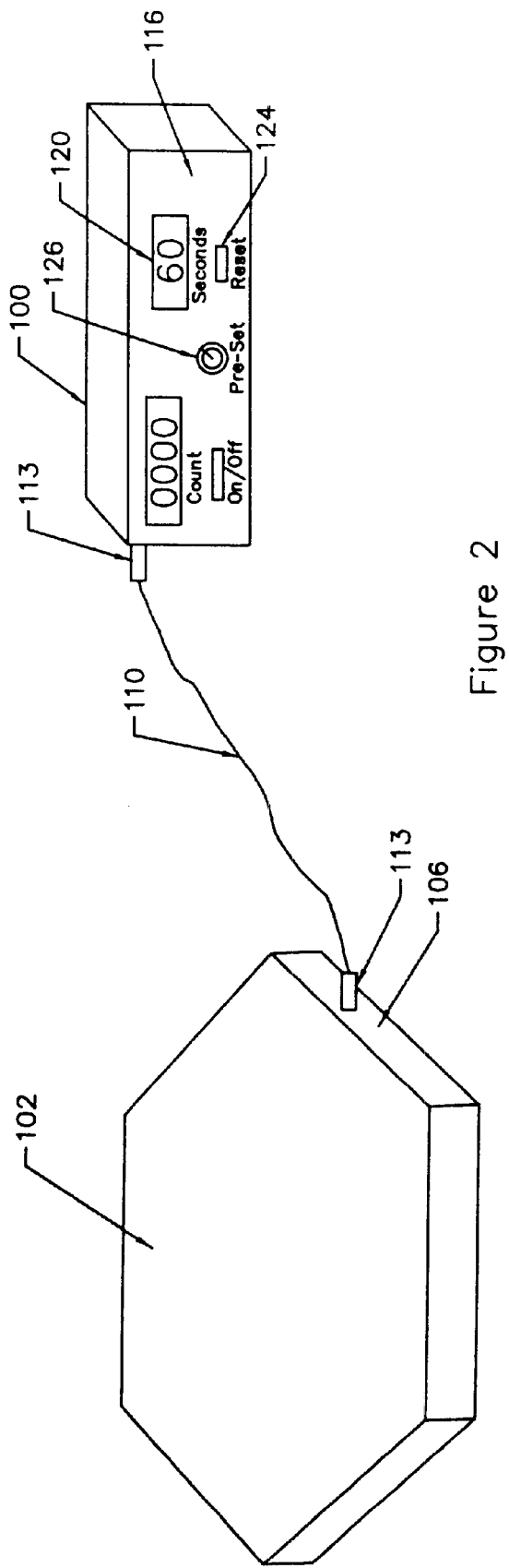
FIG. 2 is an assembly drawing of the drum beat counter attached to an electronic drum head.

FIG. 2 shows the drum beat counter 100 attached to an electronic drum pad 106 by a sensor cable 110 with standard one quarter inch jack connectors 113.

Figure 3:
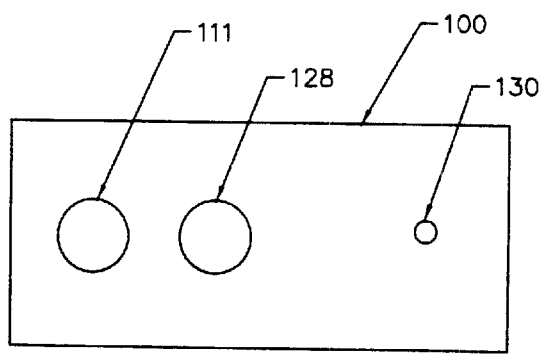
FIG. 3 is side view of the drum beat counter.

The side of the drum beat counter 100 is shown in FIG. 3 which includes a drum input port 111, an external reset port 128 and a power supply input 130. The preferred embodiment of the device 100 uses a 9 volt power supply input and is designed to be powered by a 9 volt battery or external power supply.

Figure 4:
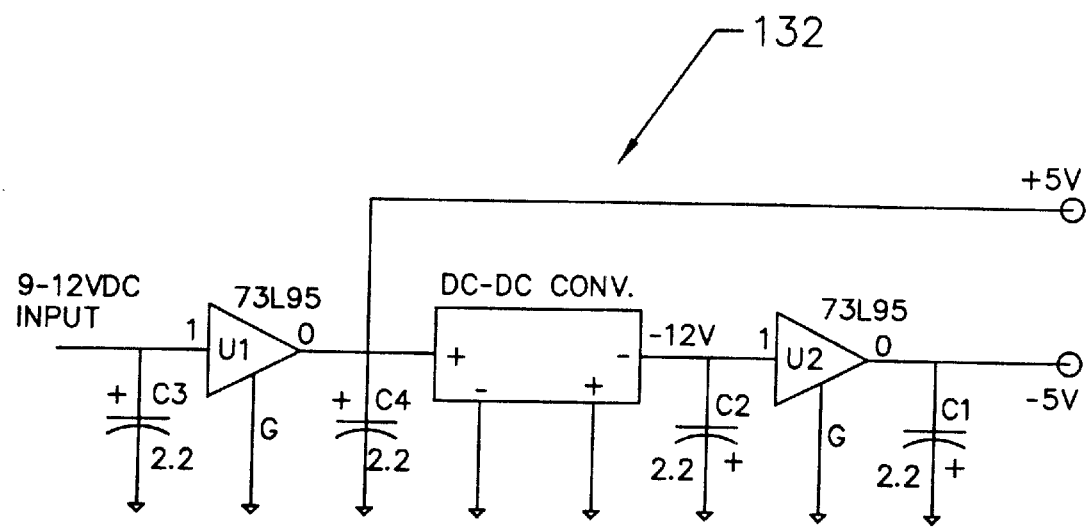
FIG. 4 is a schematic for the power supply.

FIG. 4 of the drawings shows the electrical schematic of the power supply 132 for the drum beat counter 100. An external power supply (not shown) may provide a 9 to 12 volt signal for the counter 100, which is then converted by the power supply 132 for internal operation. As is well known in the art of electronics, power supplies 132 may be designed to accept a multitude of inputs for presenting the appropriate output. Therefore, the present design 100 is shown as the preferred embodiment, but the invention is not meant to be limited by this design.

Figure 5:
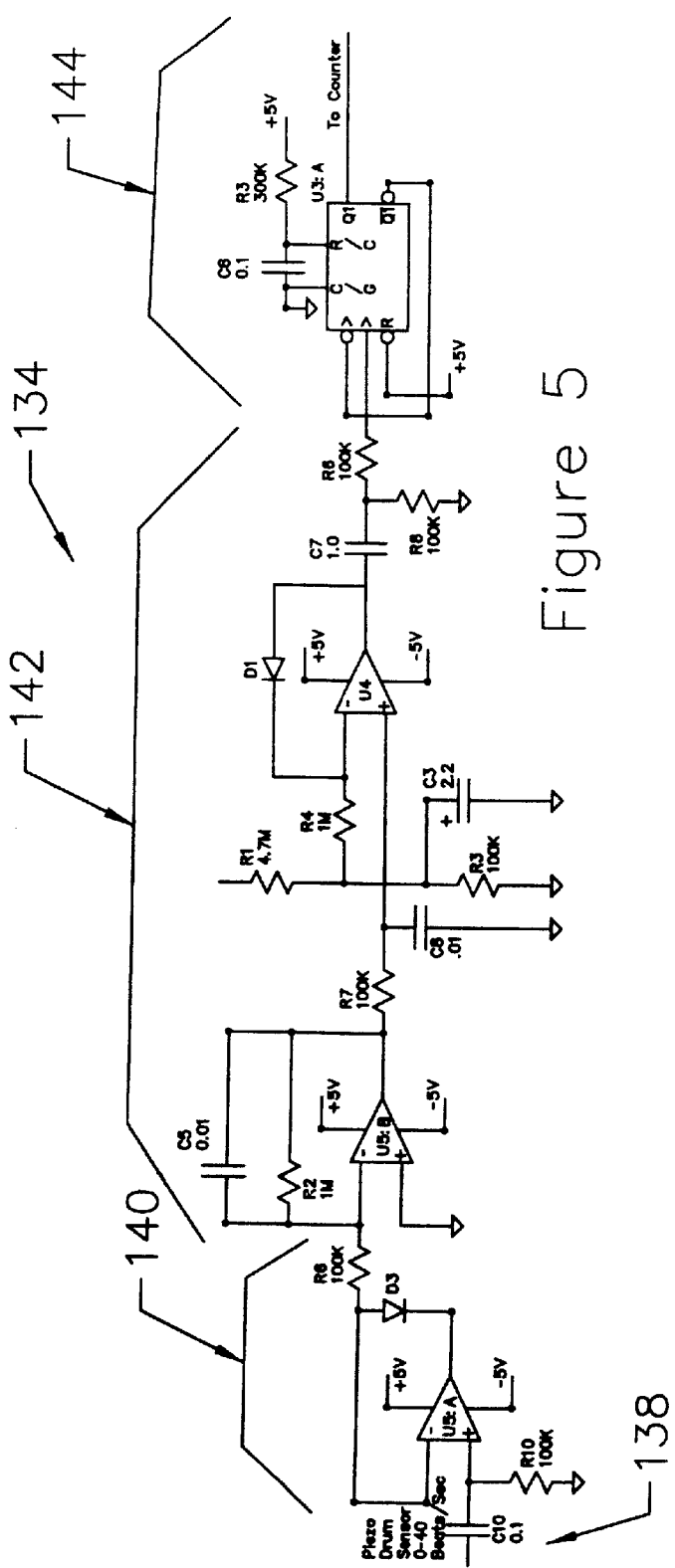
FIG. 5 is a schematic view of the signal conditioner.
Figure 6:
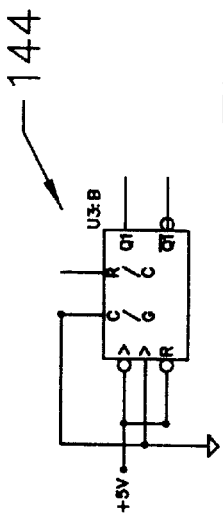
FIG. 6 is a schematic view of the additional connection for the edge trigger integrated circuit.

FIG. 5 of the drawings shows the strike signal filter as a debouncing circuit 134 for the output of the piezo sensor 108 to allow for counting the actual drum beats or strikes and not counting the after-beat vibrational reactions of the drum head 102 or sensor 108. The piezo input signal 136 is combined by the signal combiner 140 with a digital reference signal 138, generated by a signal generator, to provide a digital type combined signal for counting the number of drum beat strikes. Because the reference signal 138 provides an inherent limitation on the maximum number of strikes that may be counted by the counter, it is important that the digital reference signal 138 is operating at a sufficient clock rate to exceed the maximum number of strikes that the device 100 will need to detect. A clock rate for counting at least 40 strikes per second is recommended. Because drum heads 102 vibrate after the initial impact, it is also important to detect only the initial strike and not the subsequent vibrations of the drum head 102. The combined signal passes through a signal filter 142 and then passes through a threshold trigger 144 that is used to detect only the impact vibration associated with the initial drum strike and not the subsequent vibrations. The current design shows the values selected for the preferred embodiment and the equipment as shown, but the threshold detector values 144 will change with the types of equipment that are used. FIG. 6 of the drawings shows the remaining connections for the threshold edge trigger 144 for detecting the triggering event.

Figure 7:
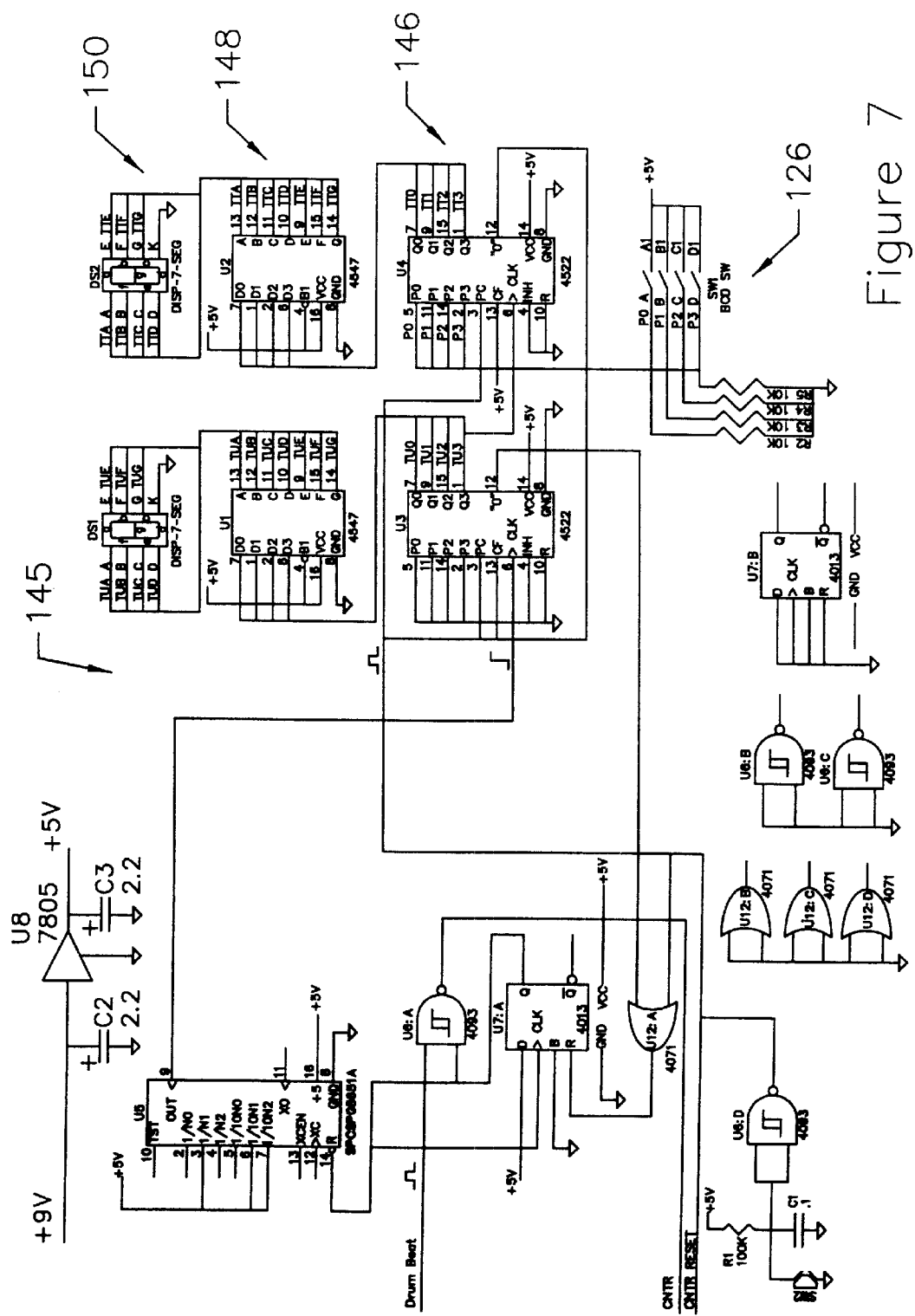
FIG. 7 is a schematic view for the drum beat timer.

FIG. 7 of the drawings shows the timer 145 and the connections of the timing circuit 146 for providing the signal to the display controllers 148 and displays 150 as used on the front of the drum beat counter 100. A known clock rate is reduced by a divide by-N type counter in the timing circuit 146 to equate to seconds as a second signal, and the second signal is then sent to the display driver 148 to drive the display 150. The preset switch 126 is used to input an initial time equating to the number of seconds for the timer to count. The amount of time to count down or count up on the device can be set using a digital or analog switch for the preset switch 126.

Figure 8:
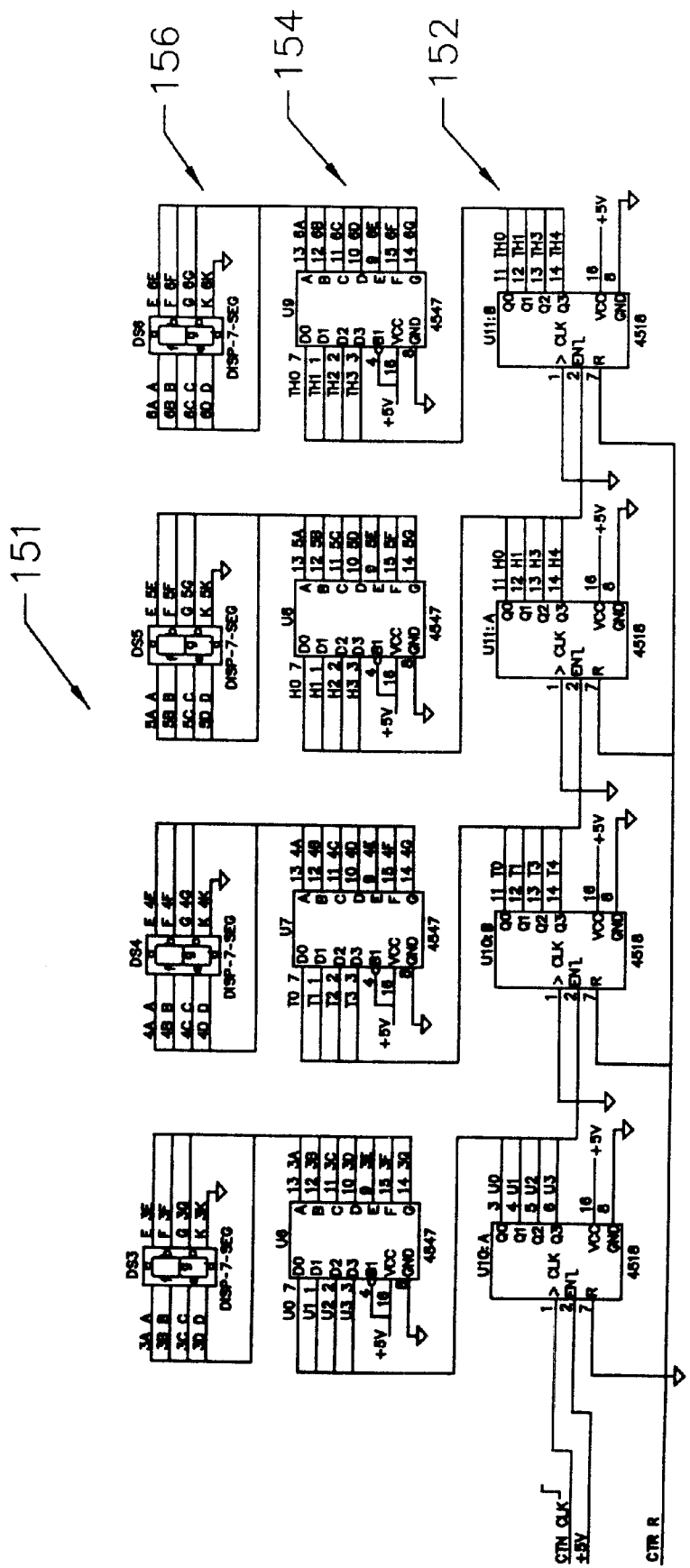
FIG. 8 is a schematic for the drum beat counter.

FIG. 8 of the drawings shows the counter 151 section of the drum beat counter 100, including the strike counter 152 and display drivers 154 for the counter displays 156 used on the front of the drum beat counter 100. FIG. 9 shows the preferred values used for the circuit components shown in FIGS. 4 through 8.

Thus, although there have been described particular embodiments of the present invention of a new and useful Electric Drum Stroke Counting Machine, it is not intended that such references be construed as limitations upon the scope of this invention except as set forth in the following claims.

What is claimed is:

1. A drum beat counter apparatus for counting the number of strikes on a surface, comprising:
    a strike sensor adapted to detect the strikes on the surface and create a strike signal each time a strike occurs;
    a strike counter electrically connected to the strike sensor and adapted to receive the strike signal, the strike counter adapted to increment a total count of the strikes that have occurred each time a strike signal is received and generate a count signal representative of the total count; and
    a count information presenter electrically connected to the strike counter and adapted to receive the count signal and present a representation of the total number of strikes on the surface.

2. The apparatus of claim 1, wherein the strike sensor is a vibrational sensor.

3. The apparatus of claim 1, wherein the strike sensor is a piezo sensor.

4. The apparatus of claim 1, further comprising:
    a strike signal filter electrically connected between the strike sensor and the strike counter, the strike signal filter adapted to remove unwanted portions of the strike signal associated with after-strike vibrations.

5. The apparatus of claim 4, the strike signal filter comprising:
    a signal generator adapted to generate a reference signal; and
    a signal combiner adapted to combine the reference signal with the strike signal.

6. The apparatus of claim 4, the strike signal filter comprising.
    a threshold detector for detecting portions of the strike signal above a threshold level and removing portions of the strike signal beneath the threshold level.

7. The apparatus of claim 1, further comprising.
    a timer electrically connected to the counter and adapted to count a period of time and stop the counter after the period of time has been counted.

8. The apparatus of claim 7, further comprising:
    a time period selector electrically connected to the timer to select the period of time to be counted by the timer.

9. The apparatus of claim 7, further comprising:
    a time information presenter electrically connected to the timer and adapted to present a representation of the period of time being counted by the timer.

10. The apparatus of claim 9, the time information presenter comprising:
    a digital LED display.

11. The apparatus of claim 1, the count information presenter comprising:
    a digital LED display.

12. The apparatus of claim 1, further comprising:
    a reset electrically connected to the counter and adapted to restore the counter to an initial count value.

13. The apparatus of claim 1, further comprising:
    a power supply electrically connected to provide power for the sensor, counter, and display.

14. The apparatus of claim 13, further comprising:
    a power switch electrically connected to the power supply and adapted to control power provided by the power supply.

15. A method for measuring the total number of strikes by a drummer on a surface, comprising:
    creating a vibrational signal corresponding to the vibrational movement of the surface associated with the strikes;
    filtering the vibrational signal for characteristics associated with the initial impact of the strikes to create an impact signal; and counting the number of impacts represented in the impact signal to create a count number.

16. The method of claim 15, further comprising:

displaying the count number to the drummer.

17. The method of claim 15, further comprising:

providing a timer adapted measure a period of time with an end time; and blocking the impact signal after the timer encounters the end time.

18. The method of claim 17, further comprising:

displaying a status of the timer to the drummer.

19. A drum beat counter apparatus for counting the total number of strikes occurring on a surface regardless of the instantaneous speed or average tempo at which the strikes occur, the drum beat counter comprising:

a vibrational piezo strike sensor adapted to detect the strikes on the surface and create a strike signal each time a strike occurs;

a strike signal filter electrically connected to the strike sensor, the strike signal filter adapted to pass only a valid portion of strike signal and remove unwanted portions of the strike signal associated with after-strike vibrations to create a filtered signal;

a strike counter electrically connected to the strike filter and adapted to receive the filtered signal, the strike counter adapted to increment a total count of the strikes that have occurred each time a filtered signal is received and generate a count signal representative of the total count;

a reset electrically connected to the counter and adapted to restore the counter to an initial count value;

a count information presenter electrically connected to the strike counter and adapted to receive the count signal and present a representation of the total number of strikes on the surface;

a timer electrically connected to the counter and adapted to count a period of time and stop the counter after the period of time has been counted;

a time period selector electrically connected to the timer to select the period of time to be counted by the timer; and a time information presenter electrically connected to the timer and adapted to present a representation of the period of time being counted by the timer.

\* \* \* \* \*